United States Patent [19]
Wieser

[11] Patent Number: 5,288,222
[45] Date of Patent: Feb. 22, 1994

[54] MOULD FOR INJECTION MOULDING MACHINES

[76] Inventor: Marianne Wieser, Hofweg 43, D-8780 Gemünden/Main, Fed. Rep. of Germany

[21] Appl. No.: 849,002
[22] PCT Filed: Oct. 15, 1990
[86] PCT No.: PCT/EP90/01745
  § 371 Date: Jun. 16, 1992
  § 102(e) Date: Jun. 16, 1992
[87] PCT Pub. No.: WO91/05650
  PCT Pub. Date: May 2, 1991

[30] Foreign Application Priority Data
Oct. 16, 1989 [DE] Fed. Rep. of Germany ........ 3934495

[51] Int. Cl.$^5$ .............................................. B29C 45/17
[52] U.S. Cl. ................................. 425/190; 425/192 R
[58] Field of Search ................ 425/183, 182, 185, 190, 425/192 R

[56] References Cited

U.S. PATENT DOCUMENTS

| | | | |
|---|---|---|---|
| 2,881,478 | 4/1959 | Gruenberg | 425/195 |
| 4,202,522 | 5/1980 | Hanas et al. | 425/185 |
| 4,861,254 | 8/1989 | Takeuchi et al. | 425/190 |

FOREIGN PATENT DOCUMENTS 3037251 4/1982 Fed. Rep. of Germany.

OTHER PUBLICATIONS

Patent Abstracts of Japan, vol. 10, No. 115 (M-474)(2172), re Japanese publication 60-245525 (A) published Dec. 5, 1985, Masatake Hoshina, assigned Nitsusei Jiyushi Kogyo K.K.; abstract published Apr. 30, 1986.
WPI English abstract of DE-OS 30 37 251, Neumeister.

*Primary Examiner*—Tim Heitbrink
*Attorney, Agent, or Firm*—Frishauf, Holtz, Goodman & Woodward

[57] ABSTRACT

The invention relates to a mould for injection moulding machines, consisting of at least two halves of a mould, each half in turn consisting of a retaining plate and at least one mould insert fitted therein and centered relative to the retaining plate, and the front side of the mould insert is in alignment with the parting surface. The task involved is to ensure that the mould inserts can nevertheless be rapidly and easily replaced. The device is designed in such a way that the mould insert is held firmly without play, in the axial direction, i.e. transverse to the parting surface, between a thrust block acting on the back of the mould insert and at least one stop in the vicinity of the front side of the mould insert, and the thrust block can be steplessly adjusted in an axial direction relative to the retaining plate. In this way, mould inserts of any desired axial dimension can be used.

18 Claims, 2 Drawing Sheets

MOULD FOR INJECTION MOULDING MACHINES

FIELD OF THE INVENTION

The invention relates to a mould for injection moulding machines and for all other machines in which a cavity, known as the contour, which corresponds to the outer shape of the object produced by injecting a material in liquid form and allowing it to solidify, is formed by placing together two halves or several sections of a mould.

BACKGROUND

In the closed state the front surfaces of the two halves of the mould are in contact with each other along the parting plane, or along the parting surface if the shape of the object to be produced precludes the use of a flat plane. Each half of the mould consists of a retaining plate which is attached to the injection moulding machine, as well as a mould insert which is let into the very robustly designed retaining plate; and the front surface of the insert, which must align with the parting surface, contains in negative form part of the contour of the object to be produced. The quality and dimensional accuracy of the objects to be produced are determined to a decisive extent by the parallel alignment of the two opposed mould inserts. This alignment can be achieved only by carrying out exact adjustment relative to the respective associated retaining plate which in turn is connected in a defined manner with the injection moulding machine.

In the past, this necessarily exact locating of the mould insert in the retaining plate was achieved by ensuring that the complete outer contour of the mould insert corresponded exactly with the associated bearing surfaces in the cavity on the retaining plate. Usually, the mould insert was manufactured as a turned part whose outer diameter corresponded exactly to the inner diameter of the likewise cylindrically configured cavity, and its axial length corresponded exactly to the depth of the cavity provided in the retaining plate.

Tolerances of 1/100 mm and even tighter have to be met by such moulds and, in addition, allowance must be made for the thermal expansion of the individual parts when the mould is used as an injection moulding tool. As a result, it was common for a large number of the moulds to be rejected as unacceptable right at the manufacturing stage.

When a mould insert is manufactured, first its rear bearing surface and its peripheral surface are manufactured to the correct size. Once they have been finish-machined, these surfaces are used as reference surfaces when the insert is clamped in another machine tool on which the negative shapes on the front side of the mould insert are machined out. However, if there is a slight deviation in dimensions during the machining, or if the dimensionally accurate contour is merely offset from the desired location, this can no longer be compensated for by reworking the rear surface or the peripheral surfaces of the mould insert, because the latter would then no longer fit tightly and without play in the associated retaining plate.

Furthermore, replacing such mould inserts in the retaining plate is a very time-consuming task, because in part this can only be done after the retaining plate has been removed from the injection moulding machine; and, because of the very small amount of play which is present following the build-up of dirt, etc., particularly after long periods of use, coupled with the need to handle the mould carefully, it sometimes takes a very long time to remove the mould insert and to fit it into the retaining plate. On the other hand, however, because of the high capital investment involved, an injection moulding machine can only be economically used if the downtimes, which are generated by among other things the replacement of the tools, can be kept to a minimum.

In addition, if any heat distortion occurs, it is no longer possible to correct the position of the mould insert in the retaining plate.

Another disadvantage of these moulds was that the retaining plates always had to be designed to accept the maximum possible axial dimension of the parts to be manufactured. Even when short parts were produced, it was still necessary to use a mould insert with the maximum elongation matching the cavity of the retaining plate. Not only did this result in high material costs for the mould insert, but also the absolute thermal distortion was increased due to the long axial dimension.

SUMMARY OF THE INVENTION

It is therefore the object of the present invention to create a mould which, despite the exact alignment along the parting surface, and despite the advantageous design of the mould inserts, can be easily and quickly replaced.

This object is accomplished by using steplessly adjustable thrust blocks to bring mould inserts into alignment with the parting plane.

By using such steplessly adjustable thrust blocks, mould inserts having any desired axial dimension may be fitted into the retaining plates and brought into alignment with the parting plane.

When the cavity for the mould insert is appropriately designed, it is additionally possible, once the thrust blocks have been retracted, to move the mould inserts deeper into the cavity, away from the half section of the mould, and then to rotate them by a certain angular amount and withdraw them through the front of the retaining plate, without having to disassemble the retaining plate for this purpose from the injection moulding machine.

It is further advantageous that the steplessly adjustable thrust blocks permit subsequent adjustments to be made to the position of the mould insert relative to the retaining plate to compensate for thermal distortion, for example, while the mould is in operation.

Advantageously, the stops for the mould insert are positioned on the front side of the retaining plate, i.e. on the other side of the parting plane, and they protrude partially into the opening in the retaining plate which is intended for the mould insert. Since the front side of the retaining plate must in any case be machined exactly plane, it is sufficient to carry out appropriate machining of the undersides of the stops, i.e. the surfaces in contact with the front side of the retaining plate, to obtain an exact and plane bearing surface on them; these stops for the mould insert project into the hollow cavity in the retaining plate and the mould inserts are pressed from behind against the stops by the thrust blocks.

Obviously, corresponding recesses must be provided in the opposite retaining plate in order to accept the stops positioned on the other opposite retaining plate. Consequently, the stops on the two retaining plates do not have to be located at matching mirror-image positions, but may be arranged offset in relation to each other. In addition, the stops must be located in the outer zones of the mould inserts because, after being rotated for example through 90°—depending on the peripheral shape of the mould insert—the inserts are removed through the front of the retaining plate. In the case of a square mould insert this means that the cavity for the mould insert in the front surface of the retaining plate takes the form of an eight-cornered, star-shaped opening corresponding to two squares having the peripheral shape of the mould insert being placed one on top of the other and rotated by 90°. In this case, the stops must engage on the mould insert in the area of the corners outside the area of the rotationally offset square, because the latter must not be blocked by the protruding stops when the mould insert is rotated into this area and removed from it. In order to guarantee that the mould insert is located with adequate stability in the retaining plate, advantageously at least one stop will engage at each corner when a square mould insert is used.

In the corners of the mould insert the stops may of course be oriented with their longitudinal axes at right angles to the outer edges of the insert on which they engage; however, it makes better sense to arrange the stops with different orientations on the two retaining plates, for example at right angles to the outer edge of the mould insert on the one plate and at an angle thereto on the other plate, for example oriented along the diagonal of the mould insert so that, by means of this optical differentiation alone, there will be no chance of the two retaining plates or mould inserts becoming mixed up.

Apart from the alignment of the front side of the mould insert on the parting plane, it is also necessary to centre the mould insert relative to the retaining plate. This is accomplished on the one hand by means of a centering element, which fits accurately into and projects from a recess on the back side of the mould insert, and the projecting part is inserted into an accurately machined recess in the retaining plate. As a rule, this centering bolt has a circular outer contour and consequently it does not define the angular position of the mould insert with respect to the retaining plate.

This is done by having two lateral surfaces of the mould insert, which are at angles to each other and preferably adjacent, interact as reference edges with the corresponding lateral surfaces of the cavity in the retaining plate. These opposite surfaces must be very accurately machined to ensure correct location and dimensions, because it must be possible to adjust the position of the mould insert in the retaining plate with an accuracy of less than 1/100 mm.

Therefore, the above-mentioned lateral surfaces of the mould insert must be forced with an accurate fit against the corresponding surfaces of the retaining plate.

When the injection moulding machine is in operation, and usually also when the halves of the mould are opened up, the parting plane is vertically oriented. In this position, the mould inserts are also replaced and adjusted, therefore the influence of gravitational force must be taken into account when aligning on the lateral surfaces. Ideally, the surfaces used for reference purposes would be those lateral surfaces of the cavity in the retaining plate which together form, at least partially, a V-shaped structure, the bottom tip of which forms the lowest point in the recess in the retaining plate. In this way the mould insert is forced by its own weight against the reference surfaces of the retaining plates.

In many cases, however, one of the two reference surfaces in the retaining plate will run at least approximately horizontally, while the other will be approximately perpendicularly oriented. In this case the lateral surface selected as the approximately vertical reference surface should be such that, when a thrust block is adjusted in an axial direction by means of an appropriate screw-drive mechanism, and the thrust block comes up against the mould insert, the latter will be forced, by the friction existing between the thrust block and the mould insert, against the approximately vertical lateral, reference surface in the cavity in the retaining plate.

In this way, all that is needed in order to adjust the mould insert is simply to clean the reference surfaces on the mould insert and on the retaining plate, and no additional adjusting elements need be fitted. Adjustment is carried out simply by tightening the thrust block against the mould insert. This procedure permits an additional saving of time when replacing the mould insert.

The centering element located on the back of the mould insert and used for centering the latter may also extend through to the contour of the mould insert, i.e. to the cavity formed by the two abutting mould inserts. This is the case when the feeder channel for adding the injection moulding material passes through the centering element. Of course, the front face of the centering element then align with the contour of the mould insert. This is accomplished by providing an appropriate shoulder section in the rear area of the centering element by means of which the centering element fits accurately against a step provided in the back surface of the retaining plate.

The material used to produce a part by injection moulding has to be supplied at relatively high pressure, therefore by applying a wider supply device with sufficient force, the centering element is pressed adequately firmly against the bearing surface in the retaining plate so that a positive fit is ensured.

In order to fix the angular position of the mould insert relative to the retaining plate, steps should be taken to ensure that the adjustment of the axial position of the thrust block is self-locking; for example, when the axial position of the thrust block is adjusted by means of a screw-drive relative to the retaining plate, the screw mechanism is of self-locking design. If this is not the case, or if for special reasons the self-locking is not regarded as adequately reliable, additional devices must be fitted to fix the angular position of the mould insert with respect to the retaining plate. However, this arrangement still has the advantage that the angular position is first adjusted via the contact with the appropriately machined lateral surfaces, and then additional fixing elements can be attached to provide further, tighter adjustment without having to carry out any additional exact positioning. Such further accurate positioning is unnecessary because it is guaranteed by the given contact between the corresponding reference surfaces on the mould insert and the retaining plate. The additional fixing devices can then be used to absorb forces which occur while the mould is in operation.

In order to be able to fully utilize, under practical conditions as well, the advantages of rapid and simple replacement of the mould inserts which the invention offers, automatic handling devices are frequently used to grip and replace the inserts, because even after a short period of operation the latter are too hot to be replaced by hand. The use of such handling devices is facilitated by the provision of attachment points in the form, for example, of undercut openings in the front face of the mould insert, outside the area of the contour. Care should be taken that these attachment points are differently shaped within a mould insert, or are positioned in such a way that the mould insert can only be gripped when the handling unit is oriented in a particular way. This is important, because the orientation of the mould inserts used, and thus for example the position of the reference surfaces of the mould insert with respect to the retaining plate, depend on the position of the handling unit relative to the retaining plate. This therefore ensures that the mould insert is correctly located in the retaining plate, with the handling unit always operating from the same position.

It should also be remembered that, even when the retaining plate is attached to the injection moulding machine and the mould insert has been fitted into the retaining plate, it must still be possible to move the thrust blocks in order to tighten or adjust the position of the mould insert. This means that, for example, when the thrust block is adjusted via a screw-drive on the retaining plate it must still be possible to rotate the thrust block even after the mould insert has been fitted. This can be done via openings at the side of each retaining plate through which, for example, a crank is inserted and engages in corresponding toothing on the thrust block to rotate the latter.

Access can also, of course, be provided from the rear of the retaining plate, i.e. from the injection moulding machine. This is desirable when fully automatic tightening of the thrust block is required.

On the other hand, for the most commonly desired, including manual, method of tensioning the thrust blocks, it is recommended that the recesses in the front side of the mould insert, which are used as handling attachment points, be extended through to the back of the mould insert and these through-openings then be used to obtain access for adjusting or rotating the thrust blocks.

If, however, the thrust block is not mechanically but hydraulically adjusted, then it would be appropriate to have a centrally located hydraulic piston axially displace the thrust block relative to the retaining plate. The centering can then also be carried out simultaneously by the appropriately accurately designed hydraulic piston, or by means of one or more guides of larger diameter than, and arranged for example concentrically to, the hydraulic piston and providing greater radial support.

DRAWINGS

One embodiment of the invention is described here by way of example on the basis of the Figures which show:

FIG. 1 A transverse section through the closed mould

FIG. 2 A corresponding view of a single retaining plate with a separate mould insert, both as per Section A—A in FIG. 4

FIG. 3 A top view of the front surface of the lower half of the mould shown in FIG. 1.

FIG. 4 A top view of the front side of the upper half of the mould shown in FIG. 1.

DETAILED DESCRIPTION

Figure 1:
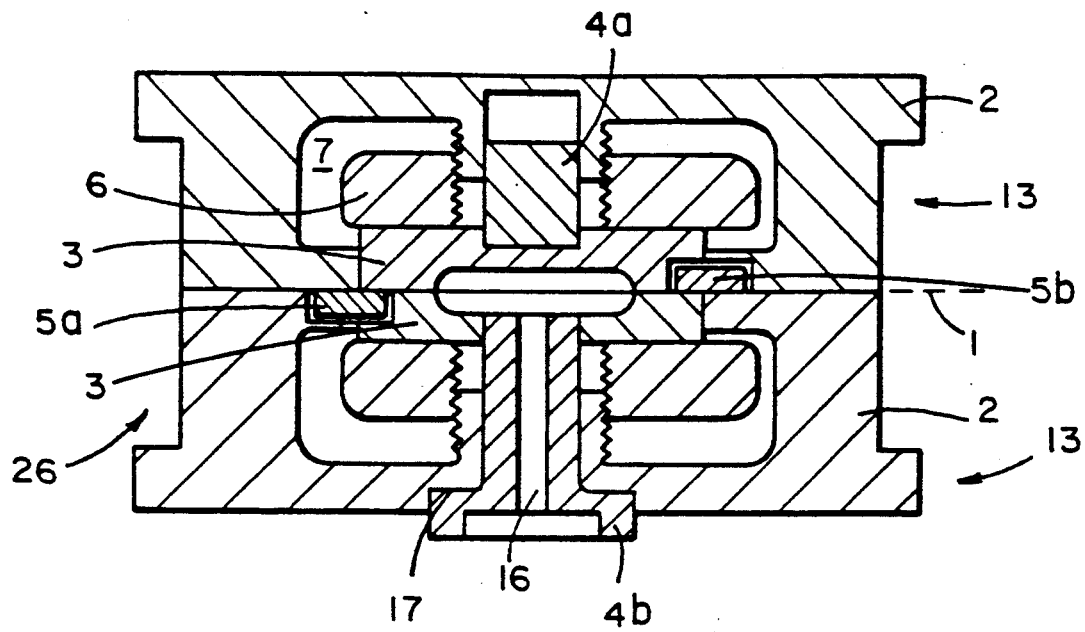

FIG. 1 presents a cross sectional view of a closed mould 26 consisting of two retaining plates 2, each of which is fitted with a mould insert 3. The two halves of the mould 13 are in full-face contact with each other along the parting plane 1, and the front surfaces 19 of the mould inserts 3, which are also aligned along this parting plane, are in contact with each other and thus form between themselves the contour 10 of the object to be produced.

However, in order to accomplish this, it must be ensured that the front side 19 of the mould insert 3 is exactly aligned with the front side 23 of the retaining plate 2 so that when the front surfaces 23 of the two retaining plates 2 are brought into contact with each other, the front surfaces 19 of the mould inserts 3 are also in alignment and in close contact with each other so that material can be injected into the mould cavity having the contour 10.

The alignment of the mould inserts 3 with the parting plane 1 is accomplished by forcing the front sides of the mould inserts 3 against the back surfaces of stops 5a and 5b which are bolted to the front side 23 of the retaining plate 2 and therefore are also in alignment with the parting plane 1.

Figure 2:
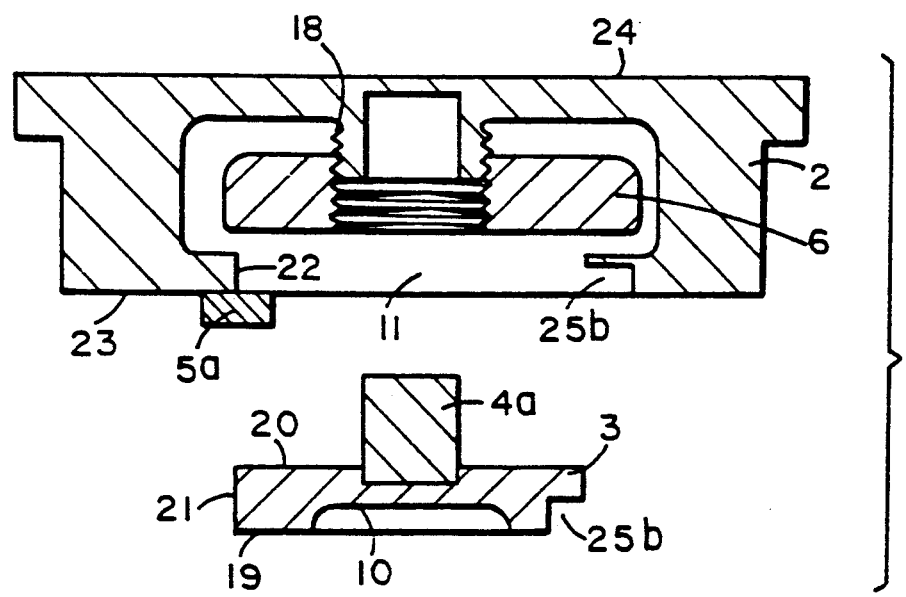

FIG. 2 depicts a mould insert 3 which has been removed from the retaining plate 2. When installed in the retaining plate the insert is held in position by several stops 5a which are distributed around the periphery. Stop 5a consists of an adequately robust, elongated plate which is bolted to the front side 23 of the retaining plate 2 and projects partially over the cavity 7 in the retaining plate. The undersides of these stops 5a, 5b, which are in contact with the front side 23 of the retaining plate 2, are machined exactly plane. They are positioned on the opposite side of the parting plane 1 with respect to the retaining plate 2 to which they are bolted. The plane-machined underside of the stops 5a, 5b, together with the sections of the stops which project over the cavity 7, form a bearing surface aligned along the parting plane 1 for the front side 19 of the mould insert.

Since the stops 5a, 5b are located on the respective opposite side of the parting plane, corresponding recesses 25a, 25b for these stops 5a, 5b must be provided in the opposite retaining plates 2 or mould inserts 3, as can be seen for example in FIG. 2.

The mould inserts 3 are forced against these stops 5a, 5b from behind by means of a thrust block 6 which can be moved axially (i.e. normal to parting plane 1) relative to the retaining plate by means of a screw-drive 18. This screw-drive is self-locking in design so that once the angular and axial position relative to the mould insert 3 has been adjusted, it will be retained while the mould 26 is in use. The thrust block 6 should as far as possible engage against the entire rear surface 20 of the mould insert 3 and the screw-drive should possess a sufficiently large diameter to prevent any tilting away from the longitudinal axis.

Such tilting away from the longitudinal axis and displacement parallel to that axis are prevented by means of centering elements 4a, 4b which possess a circular outer contour and fit tightly without any play into an appropriate recess in the back of the mould insert 3. The portion of the centering element 4a, 4b which projects from the mould insert 3 fits into an appropriately machined guide in the retaining plate 2 and is displaced longitudinally in that guide when the mould insert 3 is displaced longitudinally by thrust block 6. In the embodiment under consideration here, the thrust block takes the form of a solid plate slightly larger in size than the respective mould insert 3. In the centre of the thrust block 6 there is a threaded borehole by means of which the thrust block can be screwed onto the external thread of a pin projecting into the cavity 7 of the retaining plate 2.

While the centering element 4a is of solid construction and fits into a blind hole in the back surface 20 of the upper mould insert 3 shown in FIG. 1, centering element 4b possesses a feed channel 16 running throughout its entire length and extending through the mould insert 3 to its inner contour 10. The channel 16 is used as the passage through which material is injected into the mould. However, this means that the front face of the centering element 4b must fit flush with the inner contour 10 of the lower mould insert 3 shown in FIG. 1. In order to permit the centering element 4b to assume such a defined position in the axial direction, it is fitted elsewhere along its length, preferably close to its rear end, with a shoulder section 17 with which it rests against a corresponding bearing surface at the rear surface 24 of the retaining plate 2. The desired positioning of the front end of the centering element 4b with respect to the contour 10 is obtained by accurately machining the radial surfaces of this shoulder section 17 and the corresponding bearing surface on the retaining plate 2. The feed unit (not shown here) for the material injected into the mould exerts pressure on the shoulder 17 thereby ensuring that it is brought into contact with the corresponding bearing surface.

Figure 3:
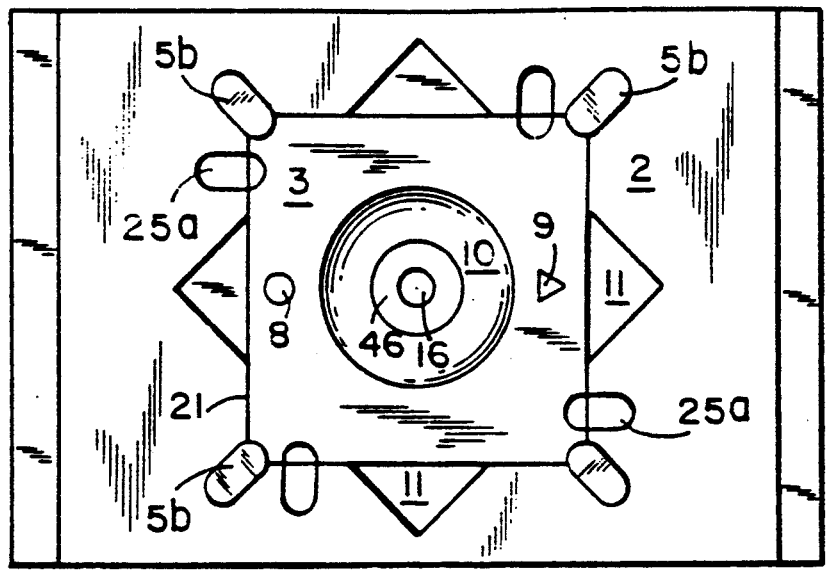
Figure 4:
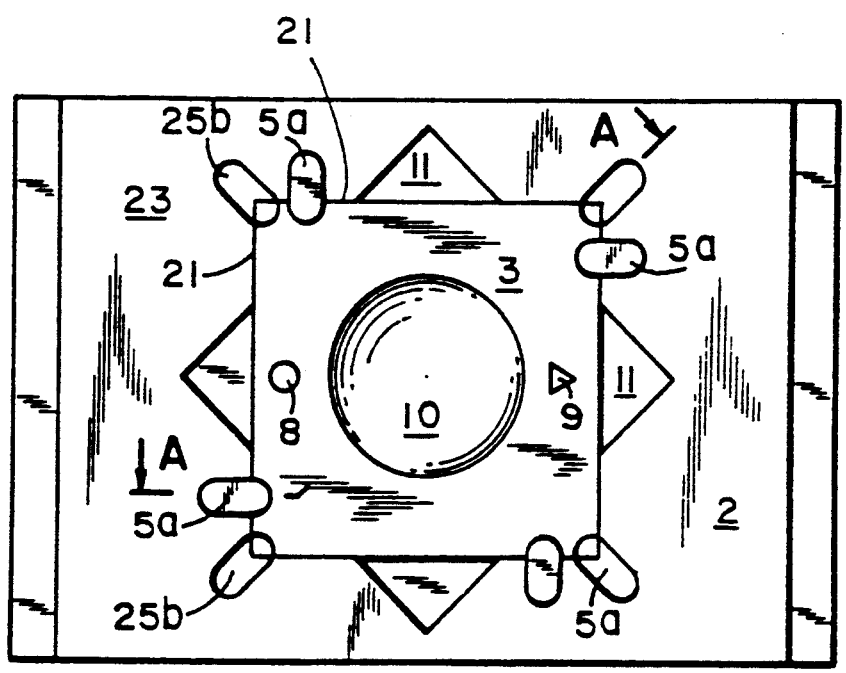

In addition to the alignment along the parting plane and also in addition to the centering along the axial longitudinal axis, for most of the parts to be manufactured in the machine, and thus also for the mould inserts 3, the angular position of the mould inserts 3 relative to each other is also relevant. However, since these inserts can never be directly positioned in relation to each other, the retaining plate 2 must possess a defined angular position relative to the mould inserts 3 fitted in it. As shown in FIGS. 3 and 4, in the embodiment being discussed here, the mould inserts are of approximately square cross section. When in operation, the retaining plates 2 are attached vertically to corresponding elements in the injection moulding machine so that the parting plane 1 is also vertically oriented. Angular adjustment of the mould insert 3 with respect to the retaining plate 2 is achieved by machining the lateral surfaces 21 of the mould insert 3 so that they are exactly straight and at right angles to each other. Similarly, the corresponding lateral surfaces 22 of the opening 11 in the front surface 23 of the retaining plate 2 are machined so as to be exactly straight and at right angles to each other. When these two pairs of surfaces come together in a positive fit, then the angular position of the mould insert 3 is defined relative to the retaining plate 2.

Since the retaining plates stand upright when in operation, and when installed the square mould insert 3 does not stand on one corner but on one of its sides, the lower, horizontal lateral surface together with an adjoining vertical lateral surface were selected as the lateral surfaces 21, 22. When the mould insert is installed, its own weight forces it into contact with the lower lateral surface. Care must now be taken to ensure that, also after the mould insert 3 has been clamped between the stops 5a, 5b and the thrust block 6, not only this lower lateral surface 21 but also the vertical lateral surface 21 are in close contact with the corresponding lateral surfaces 22. Since the thrust block 6 is displaced by screw-drive 18, the direction of rotation of the thread 18 should be selected in such a way that when the thrust block 6 is tightened against the back surface 20 of the mould insert 3, the vertical lateral surface 21 of the insert is forced against the corresponding, exactly machined lateral surface 22 of the opening 11.

This considerably eases the task of installing the mould insert because no further adjustment steps are required. All that has to be done is to fit the mould insert 3 into the retaining plate 2, in the manner described below, and then to tighten the thrust block 6 against the back of the mould insert. No additional adjusting pins, etc., with correspondingly tight fits, are required.

The mould insert 3 is installed as follows:

The cavity 7 in the retaining plate 2 extends through to the front side 23 of the plate to form the opening 11 which has the shape of an eight-cornered star, corresponding to the pattern obtained when the base area of the mould insert 3 is superimposed on itself and rotated through 90°. When the mould insert 3 is installed, it should be positioned horizontally in this star-shaped opening 11 and it is forced from behind against the stops 5a which project partially into the star-shaped opening 11. However, when it is rotated by 90° so that it stands on one corner, the mould insert 3 can be placed in the cavity 7 of the retaining plate 2, without being hindered by the stops 5a; once in the cavity, the insert can be rotated by 90° into the desired horizontal position and then be moved forward again to bring it up against the stops 5a. This is possible because the stops 5a project outwards only in the area of the horizontal or vertical outer edges of the star-shaped opening 11. The longitudinal axes of the stops 5a are oriented perpendicularly to the outer edges while the stops 5b, for which only the corresponding recesses can be seen, for example, in FIG. 4, are oriented at an angle to the outer edges, i.e. directly along the diagonal of the corresponding square of the mould insert 3. This provides an optical differentiation between the two halves of the mould 13.

Of course, for the mould insert to be placed in position, the thrust blocks 6 must be retracted to the back surface 24 of the retaining plate 2 by operating the screw-drive mechanism; this permits the mould insert 3 to be moved far enough into the cavity 7 of the retaining plate 2 for it to be rotated behind the projecting corners of the front side 23 of the retaining plate 2.

FIG. 4 also provides a top view of the uninterrupted contour 10 of the mould insert 3 which represents the outer periphery of the object which is to be produced. In contrast, FIG. 3 shows within this contour 10 the end face of the centering element 4b which extends through to the contour 10, with the opening of the concentric channel 16 through which the material to be injection moulded is supplied.

In FIGS. 3 and 4, the four areas of opening 11 which are still left open after the mould inserts 3 have been installed can be covered over to prevent dirt build-up while the injection moulding machine is in operation; however, this is not essential for the functioning of the mould because the front surfaces 19 of both mould inserts are pressed so tightly together that normally no injection moulding material can escape along the parting plane 1 and thus penetrate behind into the cavity 7 of the retaining plates 2.

FIGS. 3 and 4 also show the handling attachment points 8 and 9 in the mould insert 3. These attachment points take the form of recesses which are designed in such a way that the mould insert 3, which is heated to a high temperature after the machine has been in operation, can be gripped by an appropriate handling device. The attachment points 8 and 9 are therefore either undercut or similarly shaped, or if they are circular a threaded connection is also possible. The attachment points which are symbolically represented in FIGS. 3 and 4 by a triangle and a circle may have any desired shape, but it should be ensured, either by giving them different shapes or by positioning them unsymmetrically relative to the mould insert 3, that the handling device can grip the mould insert 3 only in a defined position. In this way, incorrect installation of the mould insert 3 is to a large extent avoided. Incorrect installation would mean that the two lateral surfaces 21 of the mould insert 3, which are machined to be reference surfaces, would not come into contact with the correspondingly formed lateral surfaces 22 of the opening 11.

The attachment points 8 and 9 may also be designed as openings in which case, after the mould insert has been installed and the corresponding handling unit has been removed, these openings would offer additionally the opportunity to reach through the mould insert 3, using an appropriately designed crank, etc., to make contact with the thrust block 6 located behind the mould insert so that the thrust block can be further tightened or loosened with respect to the mould insert 3. This is especially desirable when it would not be appropriate to provide openings through which to reach the thrust block 6 from the side of the retaining plate 2 because of other parts getting in the way.

I claim:

1. A mould (26) for use in a injection forming machine, said mould making a manufactured part by solidifying a liquid material,
comprising
at least two mould halves (13) which, when closed, are in intimate contact with each other in a defined position along at least one parting plane (1), and which, when opened, are movable relative to each other in order to remove the manufactured part, each half of the mould (26) comprising a retaining plate (2) and at least one mould insert (3) fitted therein and centered with respect to the retaining plate (2), each mould insert (3) having a front surface (19), which is in alignment with the parting plane (1), and a rear or back surface (20),
at least one stop (5a) urging each respective mould insert (3) away from said parting plane and toward its retaining plate (2);
at least one thrust block (6) urging each mould insert (3) toward said parting plane (1);
wherein each mould insert (3) is held firmly without play between said at least one thrust block (6) acting on the back surface (20) of the mould insert (3) and said at least one stop (5a, 5b) in the vicinity of the front surface (19) of the mould insert (3), and
further comprising means (18) allowing for adjustment of each thrust block (6) relative to the respective retaining plate (2) in an axial direction normal to said parting plane (1).

2. A mould according to claim 1, wherein the positions of the stops (5a, 5b) relative to the mould inserts (3) are selected in such a way, and a cavity (7) for each of said mould inserts (3) in each of said retaining plates (2) as well as an opening (11) formed in a front side of each of said retaining plates (2) are designed in such a way, that after being moved backwards into the corresponding retaining plate (2) and rotated relative to the corresponding retaining plate (2), each mould insert (3) can be removed through the front of the corresponding retaining plate (2) without having to remove the stops (5a, 5b).

3. A mould according to claim 1 wherein
the stops (5a, 5b) are positioned on the front side of each retaining plate (2) so that they are located on the respective opposite sides of the parting plane (1) relative to each retaining plate (2) and partially project into a cavity (11) provided in the corresponding retaining plate (2) for the mould insert (3), and
a front side (23) of each retaining plate (2) is fitted with recesses (25a, 25b) to accept the stops (5b, 5a) of the corresponding other retaining plate (13).

4. A mould according to claim 3 wherein
said mould inserts together define an insert (3) which (11) has the shape of an eight-cornered star and wherein four stops (3) engage against each mould insert (3) (11).

5. A mould according to claim 1 wherein the longitudinal axes of the stops (5a) are oriented at right angles to the outer edge of each mould insert (3) and the longitudinal axes of the stops (5b) run at an angle to each outer edge, along the diagonal of the mould insert (3).

6. A mould according to claim 4, wherein two lateral surfaces (21) of each mould insert (3) which are oriented at an angle to each other interact with two associated lateral surfaces (22) of an opening (11) in a corresponding retaining plate as bearing surfaces for aligning the angular position of each mould insert (3).

7. A mould according to claim 6 wherein the parting plane (1) is vertically oriented, a point of contact of the adjoining lateral surfaces (21 or 22 respectively) represents a lowest point in each mould insert (3) in an installed state.

8. A mould according to claim 1,
wherein said means allowing for adjustment is a screw-drive (18).

9. A mould according to claim 8, wherein the parting plane (1) is vertically oriented, a lower, approximately horizontal lateral surface (21) of each mould insert (3) is machined as a first bearing surface, and a second lateral surface adjoining and running at an angle to said first surface is machined as the second bearing surface, and the direction of the screw-drive (18) is selected in such a way that when the thrust block (6) is screwed against the mould insert (3), the second bearing surface of the insert is forced against a corresponding opposite surface on the retaining plate (2).

10. A mould according to claim 1 wherein a centering element (4a, 4b) is provided on the back of each mould insert (3) to permit the play-free axial alignment of the retaining plate (2).

11. A mould according to claim 10 wherein one of said centering elements (4b) extends through to the contour (10) of the corresponding mould insert (3) and possesses a channel (16) through which material is fed into the contour (10).

12. A mould according to claim 11 wherein the one of said centering elements (4b) extends at least to the parting plane (1).

13. A mould according to claim 12 wherein at its rear end, the one of said centering element (4b) possesses a shoulder (17) which interacts with a corresponding step in the corresponding retaining plate (2).

14. A mould according to claim 8 wherein the screw-drive (18) is self-locking.

15. A mould according to claim 1, wherein additional elements are provided to fix each thrust block (6) relative to the retaining plate in a certain position (2).

16. A mould according to claim 1 wherein attachment points (8, 9) for attaching a handling unit are provided on the front side (19) of each mould insert (3).

17. A mould according to claim 16 wherein the attachment points (8, 9) are differently shaped or positioned in such a way that each mould insert (3) can be gripped only when the handling unit is In a certain angular position.

18. A mould according to claim 10, wherein the centering element (4) is also a hydraulic piston.

* * * * *